July 5, 1955

J. LATZEN 2,712,462

JOINTED CONNECTING PIECE, ESPECIALLY
FOR MOTOR VEHICLE STEERING GEARS
Filed Aug. 15, 1950

INVENTOR.
JOSEF LATZEN

BY *Robert H. Jacob*

AGENT

United States Patent Office 2,712,462
Patented July 5, 1955

2,712,462
JOINTED CONNECTING PIECE, ESPECIALLY FOR MOTOR VEHICLE STEERING GEARS

Josef Latzen, Dusseldorf-Oberkassel, Germany, assignor to A. Ehrenreich & Cie., Dusseldorf-Oberkassel, Germany, a firm Application August 15, 1950, Serial No. 179,531

2 Claims. (Cl. 287—85)

My invention relates to jointed connecting pieces, especially for motor vehicle steering gears.

Object of the present invention is to provide a jointed connecting piece enabling to compensate deviations of the kinematic conditions as well as to protect the joint from detrimental effects of both excessive thrust stresses and too wide angular deflection.

The prior art motor vehicle steering gears required several elastical pieces connecting their separate parts for compensating kinematic deviations within the steering gear.

According to the present invention one elastical connecting piece formed by a rubber lining is provided adjacent to a joint intermediate a joint rod and a lever eye. Such a lining having small radial flexibility and damping effect does not impair the power transmission in rod direction, but provides the possibility of length compensation for the steering gear. Moreover transverse strains of the joint rod as well as reactions of such strains to the steering rods are avoided if excessive angular deflections are caused. The jointed connecting piece according to this invention is adapted to be mounted in the lever eye of a wheel connecting lever and at so-called guiding levers, which do not transmit any steering force, as well as at so-called guide bar levers being connected with the steering gear and transmitting the steering motion.

Other advantages obtained will be disclosed hereinafter.

Figure 2:
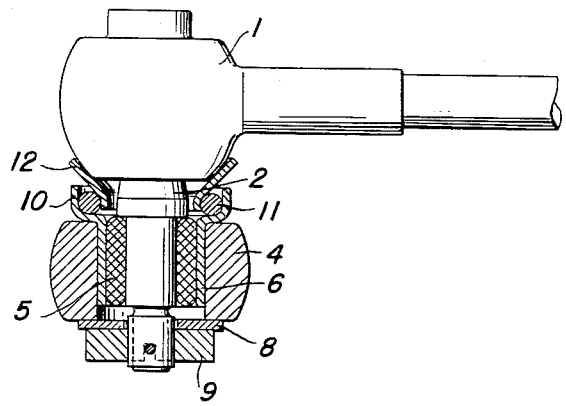
Figure 1:
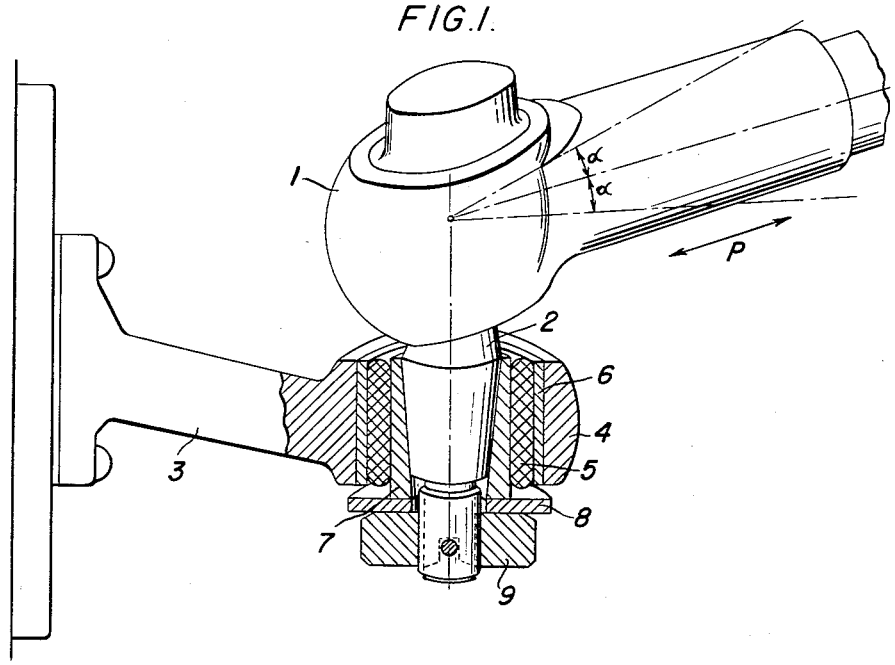

By way of example, the structural features of the jointed connecting piece redesigned according to this invention are set forth in the following specification and will be better understood by practitioners from the accompanying drawings, in which Fig. 1 shows perspectively an embodiment of the invention, partly in section;

Fig. 2 is a sectional view of another embodiment.

Similar letters refer to similar parts throughout the two views.

Referring now to the drawings a ball headed rod 2 having a conical neck projects from a ball and socket joint 1. According to Fig. 1 the joint rod 2 is supported within a bearing bush 7 the inner face of which is adapted to the tapered shape of the joint rod 2. A socket 6 is shifted over the bearing bush 7. A lever eye 4 of a wheel connecting lever 3 encloses the socket 6. Washers 8 and a horned nut 9 are provided below the neck of the joint rod 2 so as to secure the connection.

According to the structurally modified embodiment shown in Fig. 2 a lever eye 4 of a wheel connecting lever 3 encloses a cylindrical joint rod 2. Intermediate the joint rod 2 and the lever eye 4 are provided a rubber lining 5 and a socket 6 having a dish-shaped annular projection 10 extending towards the joint housing side. A rubber ring 11 pressing a cup-shaped ring 12 against the housing in a sealing manner is mounted within the dish-shaped annular projection 10.

The maximum angle of deflection as to the joint is marked by α, whereas the direction of the steering force is marked by the double arrow P.

Various structural changes and modifications may be made in jointed connecting pieces, especially for motor vehicle steering gears redesigned as shown and described, without departing from the spirit and the salient ideas of this invention.

What I claim is:

1. In a connecting joint for motor vehicle steering gears including a joint member securely supported at one end in a housing and having a stud extending from said housing, a socket member adapted to receive said stud and rigidly supported by a lever, the means adapting said joint to absorb thrusts and vibrations axially of said stud while limiting the yield in radial directions, said means comprising a metal sleeve mounted in said socket member, a rubber sleeve disposed within said metal sleeve and around said stud in said socket member, a washer of greater diameter than the diameter of said metal sleeve supported around said stud adjacent the open end of said socket member and a castle nut or the like retaining said washer on said stud and said stud in said socket member, said metal sleeve having an enlarged portion extending toward the housing, a protective shell being disposed around the lower portion of the housing and a rubber ring being supported between said enlarged portion of said sleeve and said protective shell.

2. In a connecting joint for motor vehicle steering gears including a joint member supported at one end in a housing and having a stud extending from said housing and a socket member adapted to receive said stud, the means adapting said joint to absorb thrusts and vibrations axially of said stud while limiting the yield in radial directions, said means comprising a metal sleeve mounted in said socket member, a resilient sleeve disposed within said metal sleeve and around said stud in said socket member, means adjacent the open end of said socket member retaining said stud in said socket member, said metal sleeve having an enlarged portion extending toward the housing, a protective shell being disposed around the lower portion of the housing and a resilient ring being supported between said enlarged portion of said sleeve and said protective shell.

References Cited in the file of this patent

UNITED STATES PATENTS

| | | |
|---|---|---|
| 1,833,002 | Smith | Nov. 24, 1931 |
| 1,940,466 | Sneed | Dec. 19, 1933 |
| 1,985,781 | Hufferd et al. | Dec. 25, 1934 |
| 2,071,341 | Hufferd et al. | Feb. 23, 1937 |
| 2,186,287 | Fuchs | Jan. 9, 1940 |
| 2,346,574 | Guy | Apr. 11, 1944 |
| 2,479,339 | Gair | Aug. 16, 1949 |

FOREIGN PATENTS

| | | |
|---|---|---|
| 112,223 | Australia | Dec. 23, 1940 |
| 505,978 | Germany | Aug. 27, 1930 |